No. 854,937. PATENTED MAY 28, 1907.
E. C. D'YARMETT.
GAME APPARATUS.
APPLICATION FILED NOV. 17, 1906.

Witnesses:
G. M. Stucker.
H. A. Byrne

Inventor,
E. C. D'Yarmett.
By Sugar Cushman & Pea
Attorneys.

UNITED STATES PATENT OFFICE.

EDWARD C. D'YARMETT, OF BARTLESVILLE, INDIAN TERRITORY.

GAME APPARATUS.

No. 854,937.　　　Specification of Letters Patent.　　　Patented May 28, 1907.

Application filed November 17, 1906. Serial No. 343,924.

*To all whom it may concern:*

Be it known that I, EDWARD C. D'YAR-METT, a citizen of the United States, residing at Bartlesville, in the Cherokee Nation, Indian Territory, have invented new and useful Improvements in Game Apparatus, of which the following is a specification.

The present invention relates to game apparatus of that type in which a series of movable objects are placed within a casing or box, which casing is provided with a suitably placed goal, to which goal the movable objects are directed by so manipulating the casing or box as to shift the movable objects and position one of them over or upon the objective spot marked by the goal.

Generally stated, the invention comprises a casing or box of any desired form, having a goal positioned in any desired place within the casing, which goal is surrounded by one or more obstructions; and within this casing is placed a series of movable objects which are to be shifted by the player to land them in or upon the goal.

More specifically, the invention contemplates the use of a circular, glass-covered casing having a raised, centrally placed goal, beneath which and in concealed position, is placed a permanent magnet which will attract and hold a movable object of magnetic material, and around which one or more circular ridges are placed. The movable objects within the casing which I preferably use, are small balls, which, while they are colored so as to be indistinguishable so far as the material of which they are made is concerned, are made of different materials, one of them at least being of magnetic material, while the others are non-magnetic.

Figure 1:
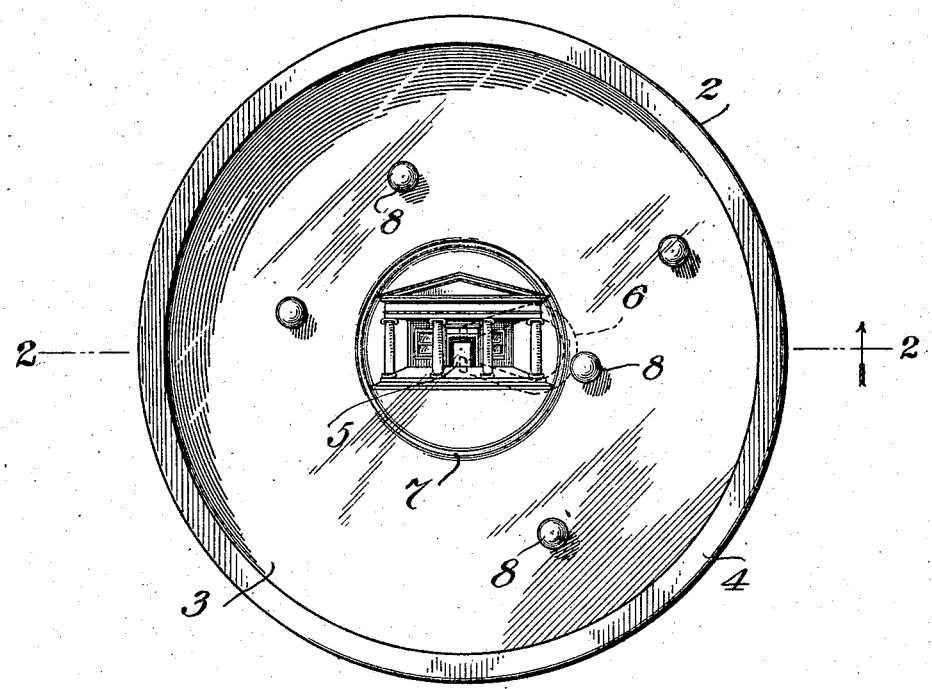
Figure 2:
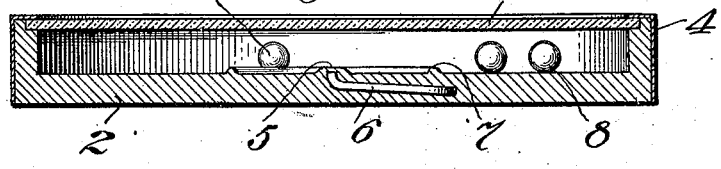

In the drawings herewith, I have illustrated one embodiment of my invention, in order that the same may be clear to those skilled in the art, and in said drawings: Figure 1 is a plan view of the game apparatus. Fig. 2 is a cross-sectional view on line 2—2 of Fig. 1.

Referring to the drawings by numerals, like numbers indicating like parts in the several views, 2 designates a circular casing or box, which may be made up of any suitable material and in any suitable manner. Said casing 2 is preferably provided with a glazed top 3 to retain the movable objects or balls within the casing, the said glazed top 3 and the casing 2 being finished and held in assembled position by means of a stripping 4 which surrounds the circumference of the box.

The bottom of the casing 2 has a centrally placed, raised goal 5, which, in the present embodiment of the invention, is shown as the door of a pictorial illustration of the White House, and beneath this raised goal 5 a magnet 6 is placed in concealed position with its poles lying directly beneath the goal 5. The magnet 6 is preferably formed as shown in Fig. 2, with its poles upturned so that they are close to the surface of the goal 5 and the field of magnetic attraction will, therefore, be strongest directly at the center of the goal, and the balls or movable objects will, therefore, be attracted only at this particular point by the magnet 6.

The central goal 5, and preferably the entire pictorial representation of the White House, are surrounded by a ridge 7 so as to interrupt the smooth surface of the box bottom and obstruct the movements of the balls as they are shifted toward the central goal 5 by manipulating the box.

The balls 8, which may be of any desired number, five being shown in the present instance, may be given different colors, and preferably, to add interest to the game, they are marked with suitable names or other designations to indicate Presidential candidates. The balls are of uniform size and are so painted as that their outward appearance gives no inkling of the material of which they are composed, but one at least of these balls will be formed of magnetic material, such as steel or iron, while the others will be formed of non-magnetic material, such as lead or brass.

It is obvious that the magnet elements may, if desired, be reversed. That is, one or more of the balls 8 might be permanently magnetized and an armature concealed beneath the goal 5 without departing from the spirit of the invention.

In playing the game, the several players will select their various candidates, and each player in turn will manipulate the box so as to locate the ball representing his candidate upon the central goal 5. Obviously great difficulty will be experienced in successfully positioning any of the non-magnetic balls upon the central goal, but the magnetic ball will be attracted by the magnet concealed beneath the central goal, and may, therefore, be worked into winning position and held without difficulty, thereby affording interest and amusement to the players.

It will be understood that variations in design, dimensions, the number of balls used, and in the obstructions or encircling ridges surrounding the central goal, may be made without departing from the spirit of my invention, and I do not limit myself, therefore, to the exact details of the present embodiment, except in so far as I am limited by the terms of the appended claims.

What I claim as new and desire to secure by Letters Patent is:—

1. Game apparatus comprising a casing, a central raised goal therein, a concealed magnet beneath said goal, a circular ridge surrounding said goal, and magnetic and non-magnetic balls.

2. Game apparatus comprising a casing having a glazed top, a central raised goal having sloping sides in said casing, a concealed magnet beneath said goal, a circular ridge having sloping sides surrounding said goal, and magnetic and non-magnetic balls.

3. Game apparatus comprising a casing having a glazed top, a central raised goal in said casing, a magnet concealed in the bottom of said casing beneath said goal, a circular ridge surrounding said goal, and a series of colored and appropriately designated balls within said casing, one at least of said balls being of magnetic material.

In testimony whereof I have hereunto set my hand in presence of two subscribing witnesses.

EDWARD C. D'YARMETT.

Witnesses:
JOHN H. KANE,
MARGUERITE STEVENSON.